US010305660B2

(12) United States Patent
Seol et al.

(10) Patent No.: US 10,305,660 B2
(45) Date of Patent: May 28, 2019

(54) METHOD AND APPARATUS FOR ALLOCATING WIRELESS RESOURCES

(71) Applicant: Samsung Electronics Co., Ltd., Suwon-si, Gyeonggi-do (KR)

(72) Inventors: Jiyun Seol, Seongnam-si (KR); Taeyoung Kim, Seongnam-si (KR); Chanhong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 15/021,166

(22) PCT Filed: Oct. 22, 2014

(86) PCT No.: PCT/KR2014/009961
§ 371 (c)(1),
(2) Date: Mar. 10, 2016

(87) PCT Pub. No.: WO2015/060645
PCT Pub. Date: Apr. 30, 2015

(65) Prior Publication Data
US 2016/0226640 A1 Aug. 4, 2016

(30) Foreign Application Priority Data
Oct. 22, 2013 (KR) .................. 10-2013-0125873

(51) Int. Cl.
H04L 5/00 (2006.01)
H04B 7/26 (2006.01)
H04B 7/06 (2006.01)
H04W 72/04 (2009.01)

(52) U.S. Cl.
CPC ......... *H04L 5/0053* (2013.01); *H04B 7/0617* (2013.01); *H04B 7/0632* (2013.01); *H04B 7/26* (2013.01); *H04L 5/0007* (2013.01); *H04W 72/044* (2013.01)

(58) Field of Classification Search
CPC .. H04L 5/0053; H04L 5/0007; H04W 72/044; H04B 7/0617
USPC .................................................. 370/329–332
See application file for complete search history.

(56) References Cited

U.S. PATENT DOCUMENTS

2011/0292847 A1* 12/2011 Yoon ..................... H04L 5/0007
370/280
2011/0317581 A1 12/2011 Hoshino et al.
2012/0287875 A1* 11/2012 Kim ....................... H04B 7/024
370/329

(Continued)

FOREIGN PATENT DOCUMENTS

EP 2 410 684 A1 1/2012
WO 2012/157870 A2 11/2012

Primary Examiner — Faruk Hamza
Assistant Examiner — Jean F Voltaire
(74) Attorney, Agent, or Firm — Jefferson IP Law, LLP

(57) ABSTRACT

Provided are a method and apparatus for radio resource allocation. The radio resource allocation method for a base station may include: obtaining at least one of beamforming structure information and frame structure information; generating resource allocation information for a CSI-RS (channel state information reference signal) on the basis of at least one of the beamforming structure information and the frame structure information; and transmitting the resource allocation information. As a result, it is possible to efficiently perform resource allocation.

13 Claims, 16 Drawing Sheets

(56) References Cited

U.S. PATENT DOCUMENTS

| | | | |
|---|---|---|---|
| 2013/0072247 A1 | 3/2013 | Park et al. | |
| 2013/0182594 A1 | 7/2013 | Kim et al. | |
| 2014/0016497 A1* | 1/2014 | Seo | H04L 5/0023 370/252 |
| 2014/0086155 A1* | 3/2014 | Chen | H04B 7/0626 370/329 |
| 2015/0049824 A1* | 2/2015 | Kim | H04B 7/0456 375/267 |
| 2016/0080051 A1* | 3/2016 | Sajadieh | H04B 7/0456 375/267 |

* cited by examiner

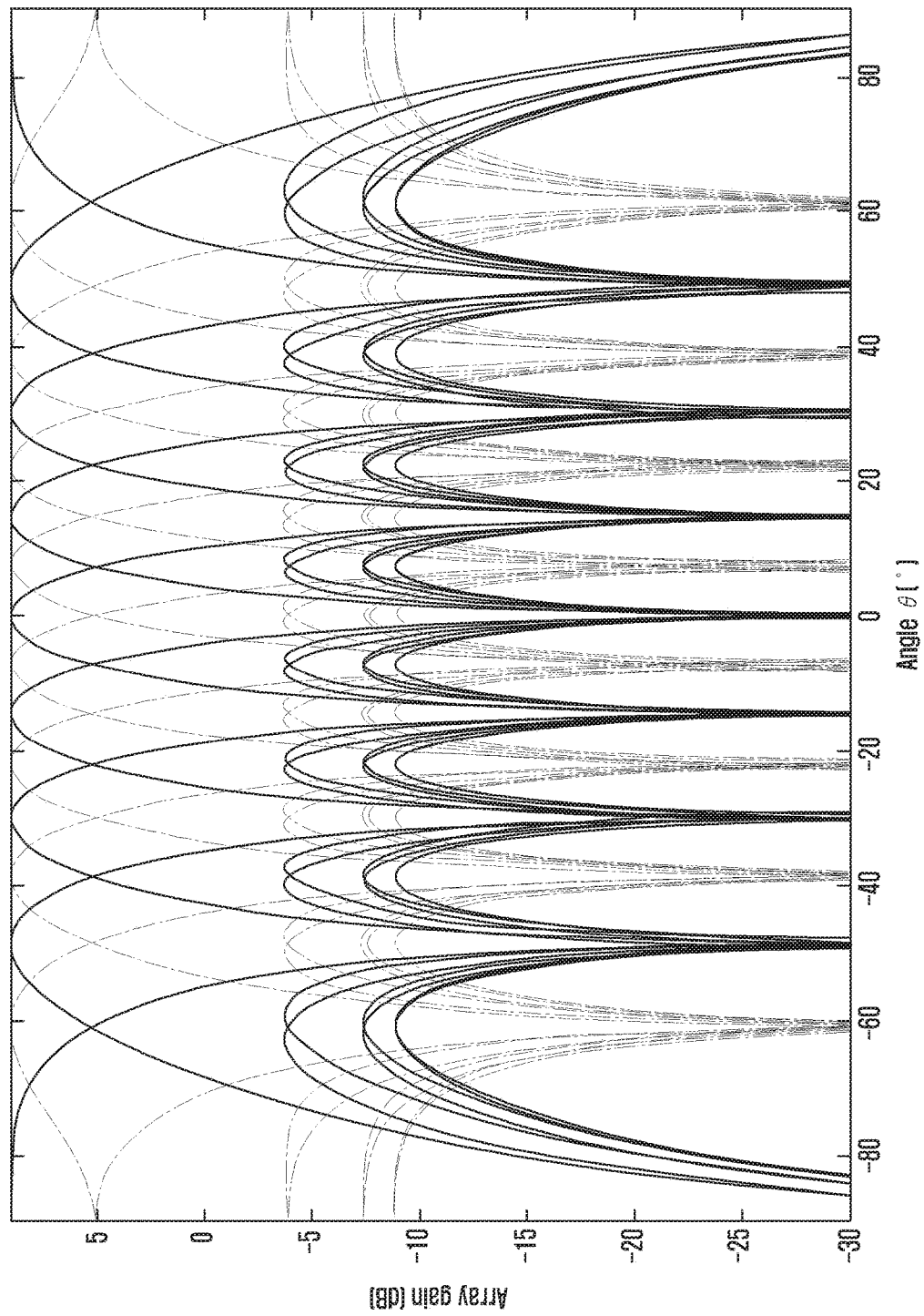

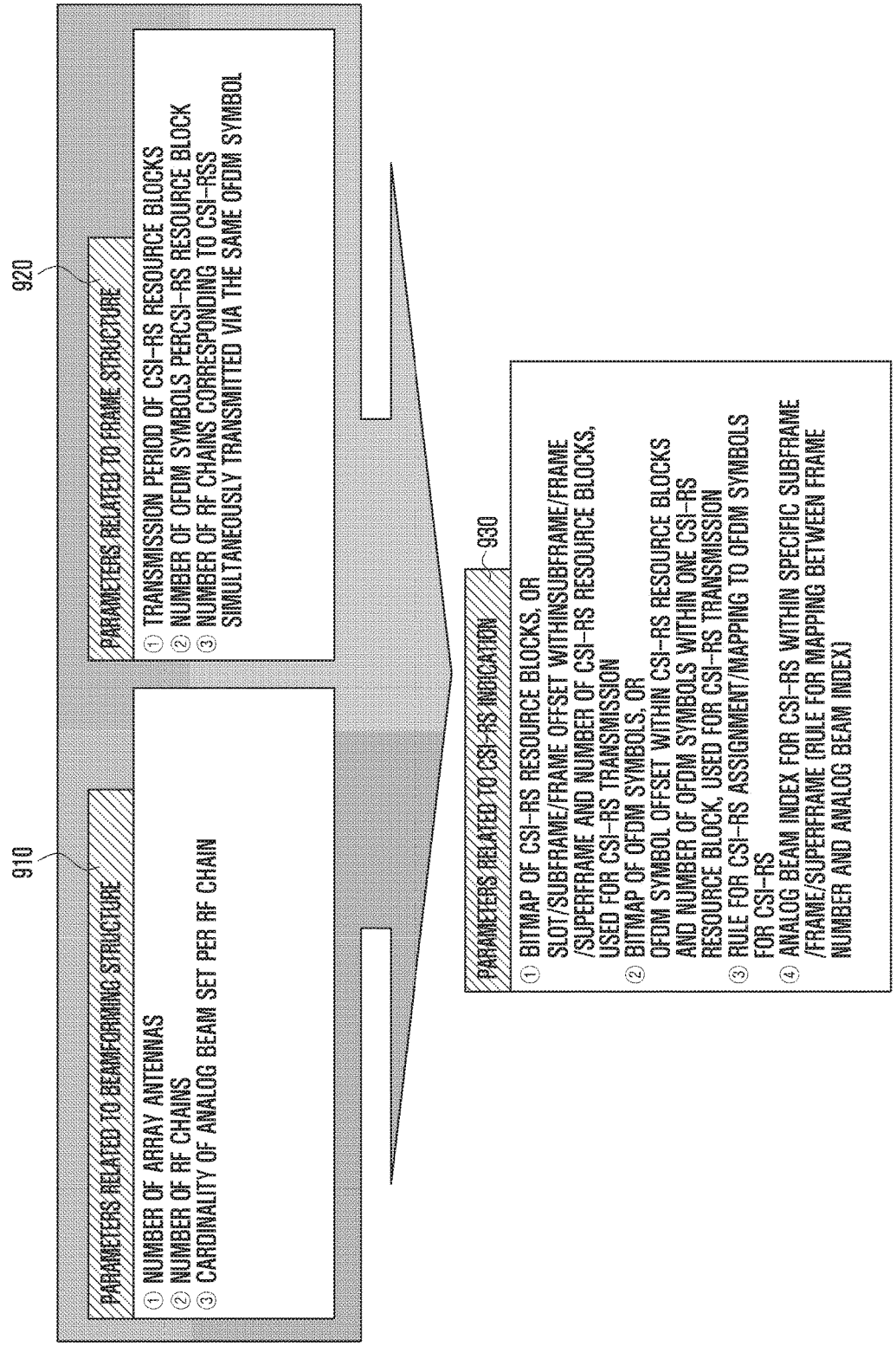

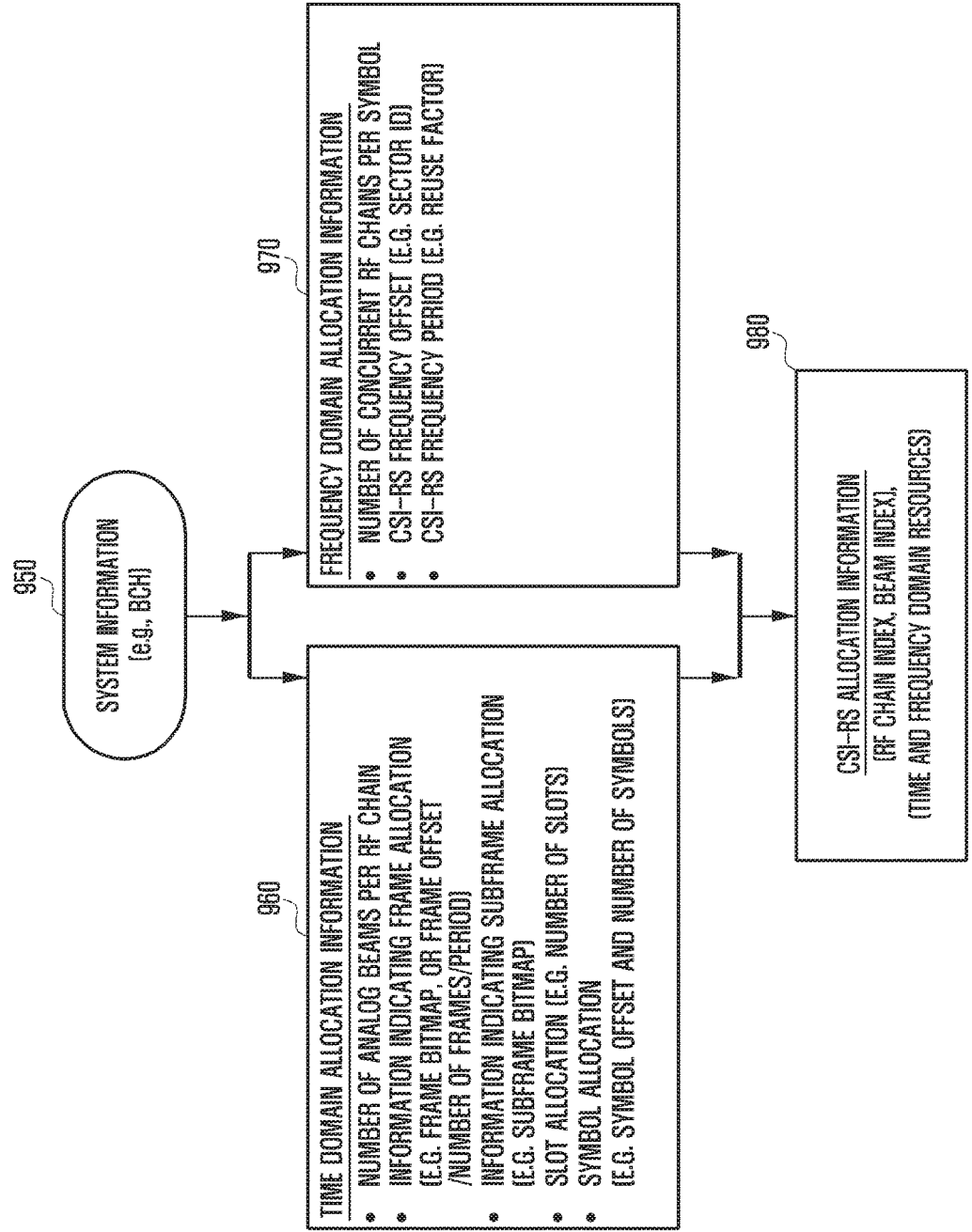

METHOD AND APPARATUS FOR ALLOCATING WIRELESS RESOURCES

TECHNICAL FIELD

The present invention relates to a method and apparatus for allocating radio resources.

BACKGROUND ART

To satisfy ever-increasing demands for wireless data traffic, wireless communication systems have been developed to support higher data rates. For example, technological development for wireless communication systems seeks to improve spectral efficiency on the basis of communication techniques such as Orthogonal Frequency Division Multiple Access (OFDMA) and Multiple Input Multiple Output (MIMO).

However, with ever-increasing demands for smartphones and tablet computers, the number of application programs generating a large amount of data traffic has rapidly increased, causing an explosive increase in demand for data traffic. Hence, improving spectral efficiency alone may be insufficient to meet such explosive demands for wireless data traffic.

As a means to overcome the above problem, wireless communication systems using the millimeter wave (mmWave) band have attracted much attention.

Wireless communication using the mmWave band may suffer from high propagation loss such as path loss and reflection loss owing to frequency characteristics of the mmWave band. Such high propagation loss causes a wireless communication system using the mmWave band to have a short range, reducing service coverage.

A wireless communication system using the mmWave band may adopt a beamforming technology to reduce signal path loss and increase the signal propagation distance, expanding service coverage.

Such a wireless communication system using beamforming may optimize the performance index such as Signal to Noise Ratio (SNR) by maximizing the beamforming gain. However, optimization of performance requires channel information, entailing a process of transmission of a reference signal (RS), measurement of a channel, and feedback of channel information or effective channel information. Particularly for a wireless communication system using bean forming based on multiple transmit antennas, considering overhead and complexity of per-antenna reference signal transmission, it is possible utilize reference signals corresponding to preset beams sent by multiple antennas. Here, the number of beams for reference signal transmission may be influenced by beamforming parameters (such as the number of array antennas, the number of antenna elements in an array antenna, and the number of RF (radio frequency) chains), and other implementation parameters viewed from system operational perspective such as the number of beams used to cover cells/sectors and beamforming gains).

DISCLOSURE OF INVENTION

Technical Problem

Accordingly, on aspect of the present invention is to provide a method that enables efficient allocation of radio resources to a reference signal corresponding to each antenna or beam and enables effective transmission of notification information indicating reference signal allocation.

Solution to Problem

In accordance with an aspect of the present invention, there is provided a method of radio resource allocation for abuse station (ENB). The method may include: obtaining at least one of beamforming structure information and frame structure information; generating resource allocation information for a CSI-RS (channel state information reference signal) on the basis of at least one of the beamforming structure information and the frame structure information; and transmitting the resource allocation information.

In accordance with another aspect of the present invention, a base station (ENB) is provided. The base station may include: a control unit to perform a process of obtaining at least one of beamforming structure information and frame structure information, and generating resource allocation information for a CSI-RS (channel state information reference signal) on the basis of at least one of the beamforming structure information and the frame structure information; and a communication unit to transmit the resource allocation information.

In accordance with another aspect of the present invention, there is provided a method of reference signal reception for a user equipment (UE). The method may include: receiving system information from a broadcast channel; obtaining resource allocation information for a CSI-RS (channel state information reference signal) from the system information; and performing CSI-RS reception according to the resource allocation information.

In accordance with another aspect of the present invention, a user equipment (UE) is provided. The user equipment may include: a communication unit to receive system information from a broadcast channel; and a control unit to obtain resource allocation information for a CSI-RS (channel state information reference signal) from the system information. The communication unit may perform CSI-RS reception according to the resource allocation information.

Advantageous Effects of Invention

In a feature of the present invention, it is possible to enhance transmission/reception performance of a wireless communication system through effective beamforming.

BRIEF DESCRIPTION OF DRAWINGS

FIGS. 6A and 6B are a graph showing a relationship between angles and gains for a given beam pattern.

FIG. 9A illustrates a procedure for reference signal allocation at the base station.

FIG. 9B illustrates a procedure for parameter extraction at the user equipment.

MODE FOR THE INVENTION

Figure 1:
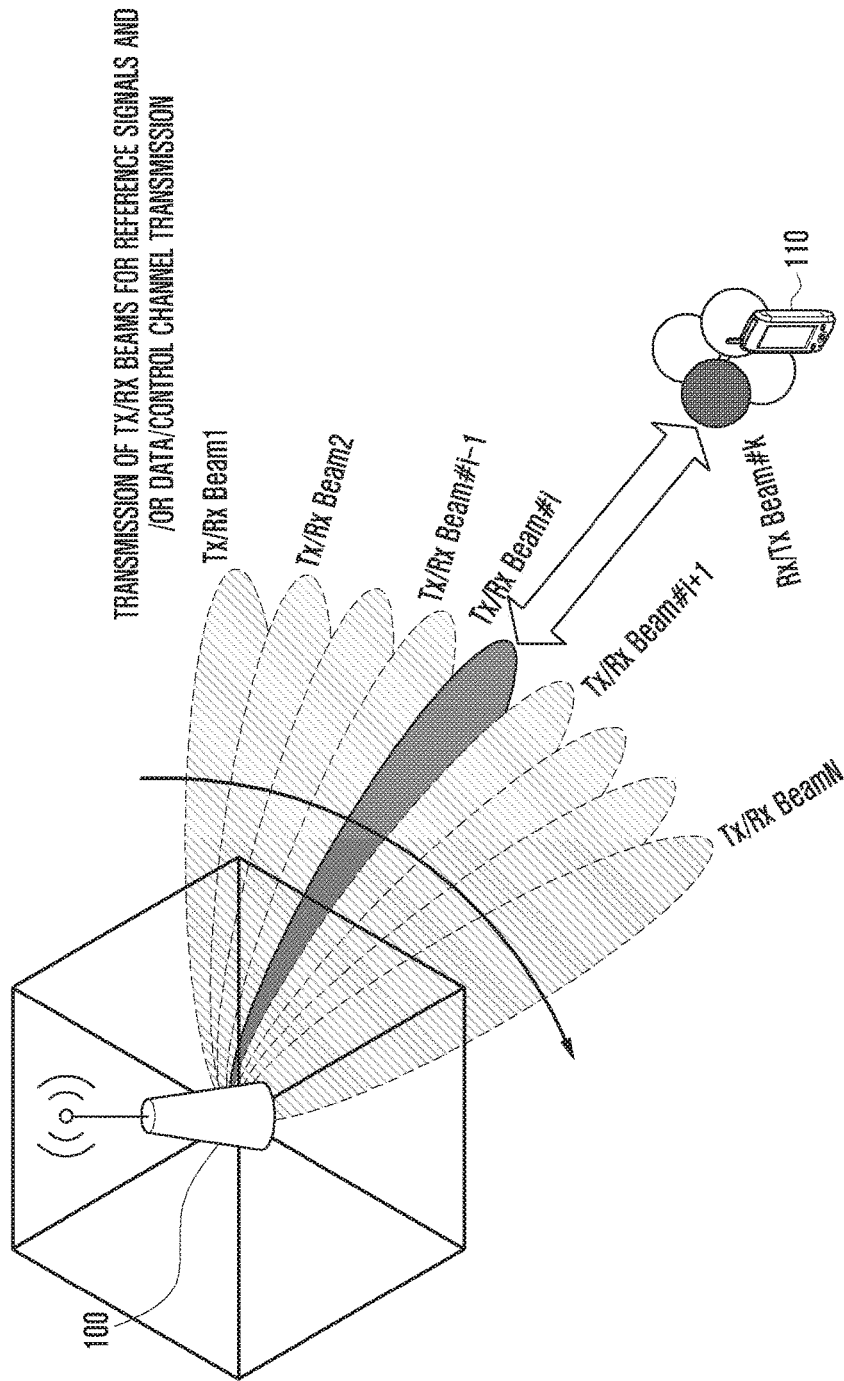
FIG. 1 depicts communication between a base station 100 managing multiple transmit beams in one sector and a user equipment 120 supporting multiple receive beams.

Hereinafter, embodiments of the present invention are described in detail with reference to the accompanying drawings.

Detailed descriptions of well-known functions and structures incorporated herein may be omitted to avoid obscuring the subject matter of the present invention.

In the drawings, some elements are exaggerated, omitted, or only outlined in brief, and thus may be not drawn to scale. The same or similar reference symbols are used throughout the drawings to refer to the same or like parts.

Embodiments of the present invention may be applied to analog beamforming, digital beamforming, or a combination thereof (hybrid beamforming). A wireless communication system based on beamforming may utilize one or more directional beams for the downlink. Some embodiments may be related to a method and apparatus that enable efficient allocation of time-frequency resources to a reference signal (RS) corresponding to multiple beams and enable effective transmission of allocation information according to various beamforming configurations and/or system operations in a wireless communication system based on beamforming.

Transmission beamforming generally uses a plurality of antennas to concentrate signal arrival regions in a particular direction, increasing directivity. The collection of multiple antennas is referred to as an array antenna, and an antenna included in the array antenna is referred to as an antenna element or array element. Array antennas may be configured in various types such as a linear array and a planar array.

A transmitter using transmission beamforming may increase the propagation distance by increasing signal directivity. In addition, when transmission beamforming is used, the signal is hardly transmitted in any direction other than the intended direction. As a result, interference influencing another user can be significantly reduced.

It is also possible to apply reception beamforming at the receiver using a receiving array antenna. Reception beamforming concentrates signal reception in a certain direction. The receiver using reception beamforming may increase signal reception sensitivity and exclude signals in any direction other than the intended direction, blocking interference signals.

A wireless mobile communication system operating at a high frequency band may use a beamforming technique to alleviate severe propagation path loss at high frequencies. Further, the high frequency band wireless system needs to apply beamforming with respect to all cases in order to reduce the unbalance between data and control signals. As an existing beamforming technique, the IEEE (institute of Electrical and Electronics Engineers) 802.11ad standard employs Sector Level Sweep (SLS) and Beam Refinement Protocol (BRP).

As a wireless LAN (WLAN) based technique, the IEEE 802.11ad standard provides a very narrow coverage of 10-20 meters in radius at the 60 GHz mmWave band. Here, beamforming is used to solve the problem of signal transmission characteristics at the mmWave band.

During the SLS stage, the initiator station repeatedly sends the same sector frame in various directions, and the peer station receives each sector frame using a quasi-omnidirectional antenna and sends feedback indicating the most sensitive direction. Thereby, the initiator station may obtain information on the most sensitive direction for the peer station to initiate beamforming.

To enhance the beamforming gain after SLS, the BRP stage is performed to fine-tune the direction of Tx and Rx beams between the two stations. In general, the two stations perform SLS to find an optimum Tx beam first and perform BRP to find an Rx beam best matching the found Tx beam. The stations may repeat the above procedure to fine-tune the directional combination of Tx and Rx beams.

In contrast, existing pre-5 G wireless mobile communication systems have been configured to support control channels and data transfer based on isotropic or omnidirectional antennas operating at sub 1 GHz or 1-3 GHz frequency bands. As an exceptional case, some 4G systems may support digital beamforming to selectively allocate resources to users satisfying specific channel conditions.

In the case of existing cellular systems, researches have been focused on obtaining additional performance gains by use of multipath propagation characteristics specific to channel conditions and transmission/reception diversity via multiple Tx/Rx antennas like MIMO.

In contrast, for the extremely high frequency band like the mmWave band, the channel characteristics described before and use of transmission/reception beamforming reduce multipath propagation effects, which makes it advantageous to obtain a beamforming gain but makes it difficult to support transmission/reception diversity. As such, conventional researches have been limited to determining beamforming weight coefficients for optimizing a performance index such as received SNR by maximizing the beamforming gain when beamforming is applied.

The Wireless Gigabit Alliance (WiGig) technology does not support MIMO and mainly uses beamforming based on one RF path and an analog array of multiple RF/antenna elements. During beamforming, sweeping is performed in various directions for a specific beam pattern, and the receiver selects one beam with the highest signal level and feedbacks the corresponding information. However, this technique is applicable to an indoor environment where the channel path is identical to the line of sight (LOS) within a short distance of several meters without mobility.

On the other hand, for outdoor wireless mobile communication, it is necessary to consider mobility reaching several kilometers per hour, fast rotation of the terminal, non-LOS path characteristics due to obstacles, and fast changes in channel conditions due to channel fading. Use of beamforming with narrow beamwidths heightening directivity and maximizing the beamforming in a specific direction alone may fail to prevent significant performance degradation according to user environments in outdoor wireless mobile communication.

Hence, it is necessary for the communication system to estimate channels of different beams for each antenna in consideration of selecting the best one of multiple beams transmitted in two or more directions, or selecting one from among combinations of multiple beams for performance enhancement. Here, as point-to-multipoint transmission is a typical case for a cellular system, it is possible to share per-antenna/beam reference signals between multiple users for channel quality estimation.

In the case of per-antenna/beam reference signals for channel estimation in a wireless communication system based on beamforming, there may be a wide variety of combinations of reference signals according to system design parameters such as beamforming configurations, and directions and gains of beams considered for system operation. Hence, there is a need for an efficient scheme that can allocate reference signals according to a wide variety of combination and transfer the corresponding allocation information.

That is, in a wireless communication system based on beamforming, various antenna combinations and multiple beams may be utilized according to beamforming configurations and system designs using beams. As such, it is necessary to support reference signals in consideration of antenna combinations and multiple beams.

In an embodiment of the present invention, there is provided a scheme that enables a base station to allocate time/frequency resources for transmission of a reference signal per Tx antenna/RF chain/beam and to send corresponding reference signal allocation information to a user equipment.

In a beamforming based system using analog beamforming via array antennas, per-Tx antenna/RF chain/beam reference signals may be generated in various forms according to analog beamforming configurations related to array antennas and operational system requirements based on beams related to analog beamforming.

For a given frame structure, there is a need for a scheme that can manage per-antenna/RF chain/beam reference signals in a flexible manner according to the beamforming configuration and system design.

One embodiment of the present invention may relate to a scheme that enables the base station to assign per antenna/RF chain/beam reference signals to time/frequency resources in a flexible manner in consideration of the beamforming configuration and frame structure and to derive a parameter or indicator indicating such reference signal allocation information.

One embodiment of the present invention may relate to a scheme that enables the base station to send a user equipment at least one of parameters indicating the derived reference signal allocation information.

One embodiment of the present invention may relate to, for hybrid beamforming, a scheme that enables a user equipment to interpret per-antenna/RF chain/beam reference signal allocation information from the base station and to derive time/frequency resource mapping information for estimating effective channel information after analog beamforming.

One embodiment of the present invention may relate to a scheme that enables a user equipment to derive a per-antenna/RF chain/beam index of the base station according to a given frame structure on the basis of per-antenna/RF chain/beam reference signal allocation information from the base station.

One embodiment of the present invention may relate to a scheme that enables a user equipment to estimate channel information per antenna/RF chain/beam by use of resource allocation information for reference signal transmission and to perform channel estimation feedback for hybrid MIMO/beamforming.

FIG. 1 depicts communication between a base station (ENB) 100 managing multiple Tx beams in one sector and a user equipment (UE) 110 supporting multiple Rx beams, In FIG. 1, it is assumed that Tx beams (Tx Beam1 to Tx BeamN) of the ENB 100 are identical in width and direction to Rx beams (Rx Beam1 to Rx BeamN) thereof.

The ENB 100 operates Tx beams (Tx Beam1 to Tx BeamN) within a sector. The ENB 100 may perform simultaneous or successive sweeping to send multiple beamformed signals through Tx beams (Tx Beam1 to Tx BeamN). In one embodiment, the UE 110 may receive signals in all directions (omnidirectional) when Rx beamforming is not supported. In another embodiment, the UE 110 may receive signals using one beamforming pattern at a time when Rx beamforming is supported with receiver structure restrictions. In another embodiment, the UE 110 may receive signals using multiple beamforming patterns in different directions when Rx beamforming is supported.

A user equipment not supporting Rx beamforming may measure channel quality for a reference signal related to each Tx beam of the base station, report the measured channel quality, and select the best one of multiple Tx beams of the base station. A user equipment supporting Rx beamforming may measure, for each UE Rx beam pattern, channel quality for multiple ENB Tx beams, and report measurement results for all (or some top) combinations of ENB Tx beams and UE Rx beams to the base station. Based on the measurement results, the base station may assign an appropriate Tx beam to the user equipment. Here, when the user equipment is capable of receiving multiple Tx beams of the base station or of supporting multiple combinations of ENB Tx beams and UE Rx beams, the base station may perform beam selection in consideration of transmission diversity via repeated transmission or simultaneous transmission.

Figure 2A:
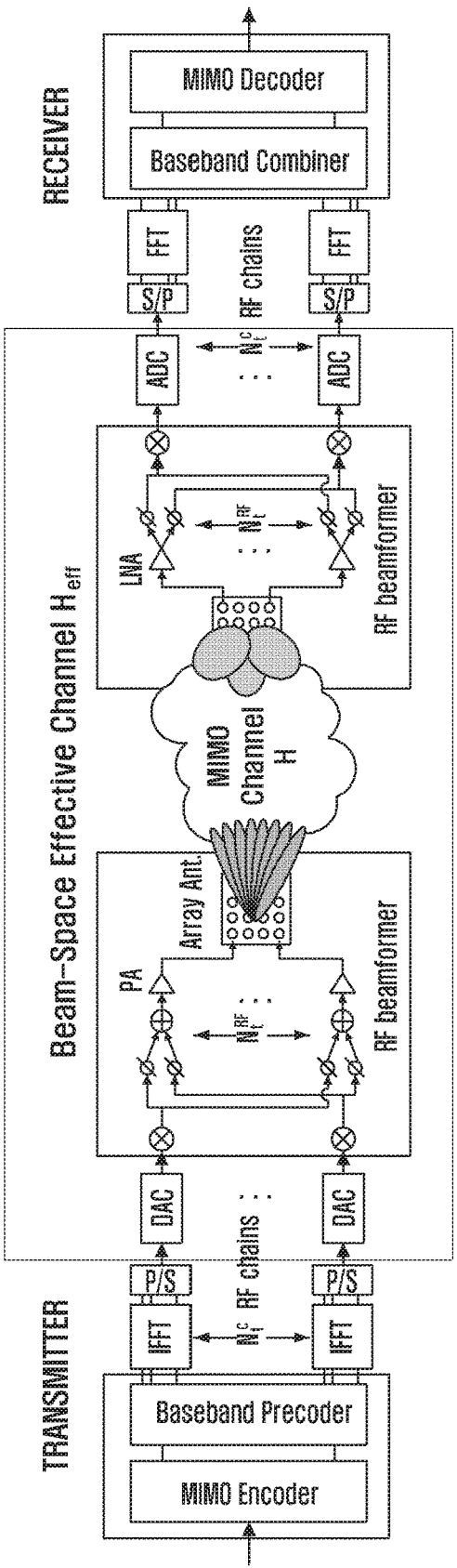
FIGS. 2A and 2B are a block diagram of the physical layer (PHY) at the base station transmitter supporting beamforming.
Figure 2B:
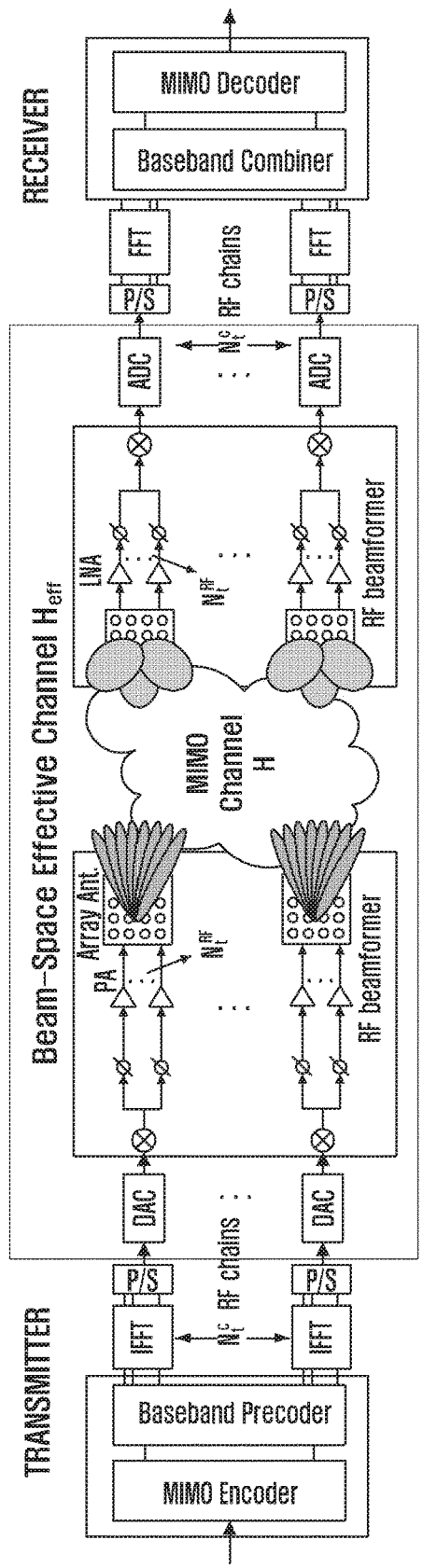

FIGS. 2A and 2B are a block diagram of the physical layer (PHY) at the base station transmitter supporting beamforming. As an example of a general beamforming support structure, there is shown a hybrid beamforming structure using both analog beamforming and digital beamforming. The analog beamforming block after digital-to-analog converters (DACs) generates beams in a specific direction by controlling phases and amplitudes for multiple antenna elements via multiple phase shifters and power amplifiers (PAs)/variable gain amplifiers (VGAs). Here, in general, multiple antenna elements are grouped into array antennas to increase the beamforming gain. Before DAC, in addition to the beamforming gain, the transmitter may perform various operations for multi-user support, frequency selective assignment, and multiple beamforming through an RF path block including multiple inverse fast Fourier transform (IFFT) units, and an MIMO precoder block. The beamforming structure may be actualized in various forms according to changes and combinations of the above blocks.

Based on such a hybrid beamforming structure, a consideration is given to transmission/reception of a reference signal, data channel, and control channel through one or more beams, which have a specific gain in different directions and cover the ENB cell/sector coverage through analog beamforming. The transmitter generates beams by adjusting the beamforming coefficient of the analog/digital end so that a selected beam may have a specific beamwidth and beamforming gain in a desired direction. Here, in general, under the same antenna input power, when the beamwidth is wide, the maximum beamforming gain in a desired direction is small.

FIGS. 2A and 2B are different examples of a hybrid beamforming structure combining analog beamforming and digital precoding/beamforming. In FIG. 2A, multiple RF chains, each serving as a unit of digital precoding, are fed into one common array antenna (sharing) through corresponding phase shifters and PAs/VGAs (analog RF components), respectively. In FIG. 2B, one or more array antennas are used, and each array antenna is connected with one RF chain between the digital domain and the analog domain through multiple phase shifters and PAs/VGAs. Hence, a transmitter having a structure shown in FIG. 2B has another degree of freedom with respect to utilization of different array antennas in addition to the degree of freedom with respect to utilization of analog beams in different directions for each array antenna.

The description on the beamforming transmission structure/operation of FIG. 2 may be applied to the beamforming reception structure/operation with changes of some components (e.g. FFT LNA, ADC). It is also possible to consider a combination of Tx beamforming and Rx beamforming different from that of FIG. 2A or 2B.

Figure 3:
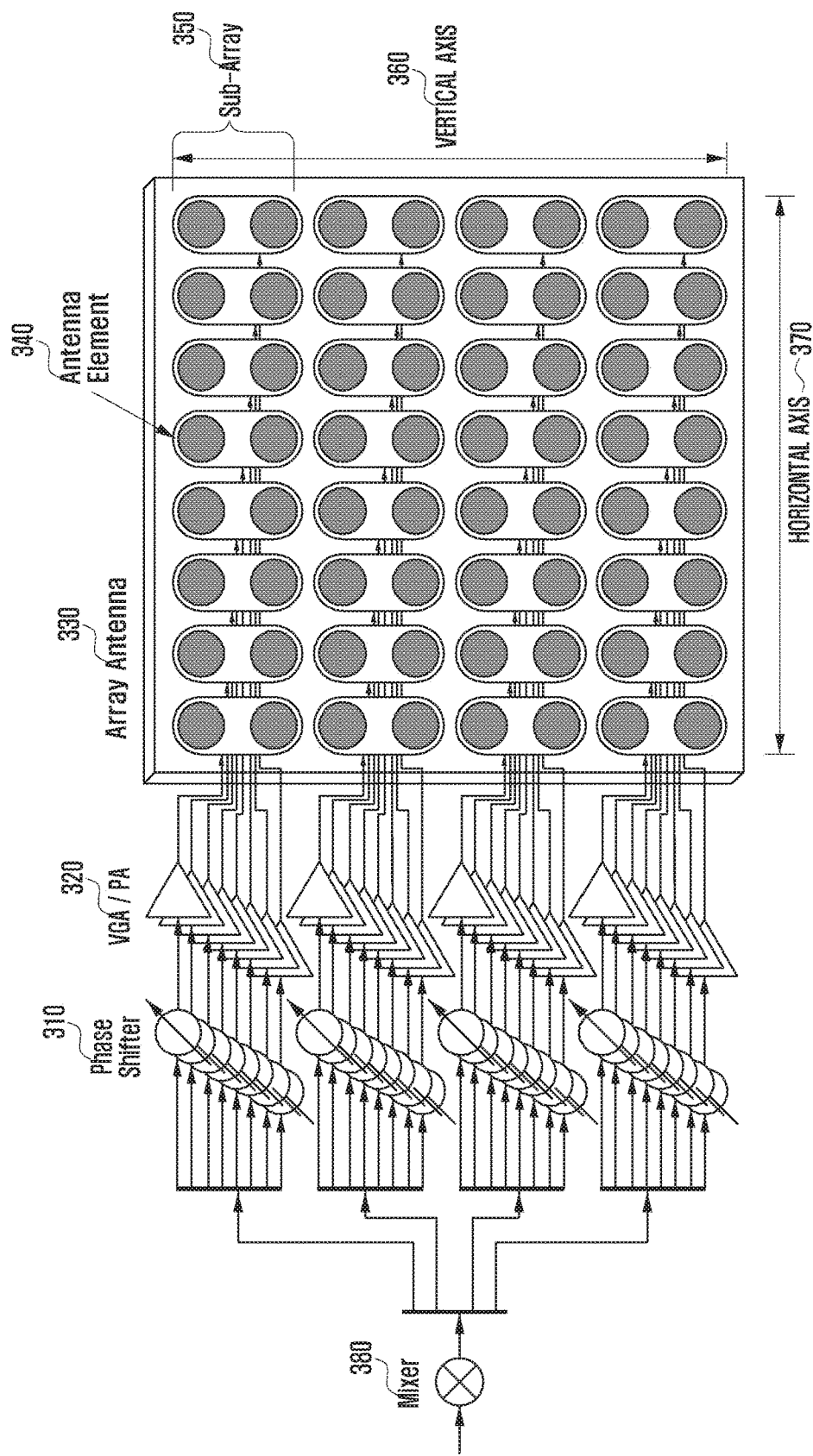
FIG. 3 shows a detailed structure of an array antenna at the transmitter of FIG. 2a FIG. 4 is a graph of an analog beam pattern.

FIG. 3 shows a detailed structure of an array antenna at the transmitter of FIG. 2B. FIG. 3 shows an array antenna 330 in the form of an 8×8 uniform planar array (UPA). In the horizontal axis 370, individual antenna elements 340 receive signal input through phase shifters 310 and PAs/VGAs 320, respectively. In the vertical axis 360, the antenna elements 340 are grouped into sub-arrays 350 of two elements and each sub-array 350 receives the same input. This configuration is adapted for a general cellular system where a high degree of freedom is required for beamforming in the horizontal direction to achieve fine-grained control for adaptive signal transmission while a relatively low degree of freedom is sufficient for beamforming in the vertical direction. That is, a large number of antenna elements are arranged along the vertical axis to enhance the beamforming gain, and sub-array structures can be introduced along the vertical axis to reduce complexity due to the increased number of analog/RF components.

In the above array antenna configuration supporting analog beamforming or hybrid beamforming including analog beamforming, analog beams covering the cell/sector may be defined differently in shape and number for the horizontal direction and the vertical direction.

Figure 4:
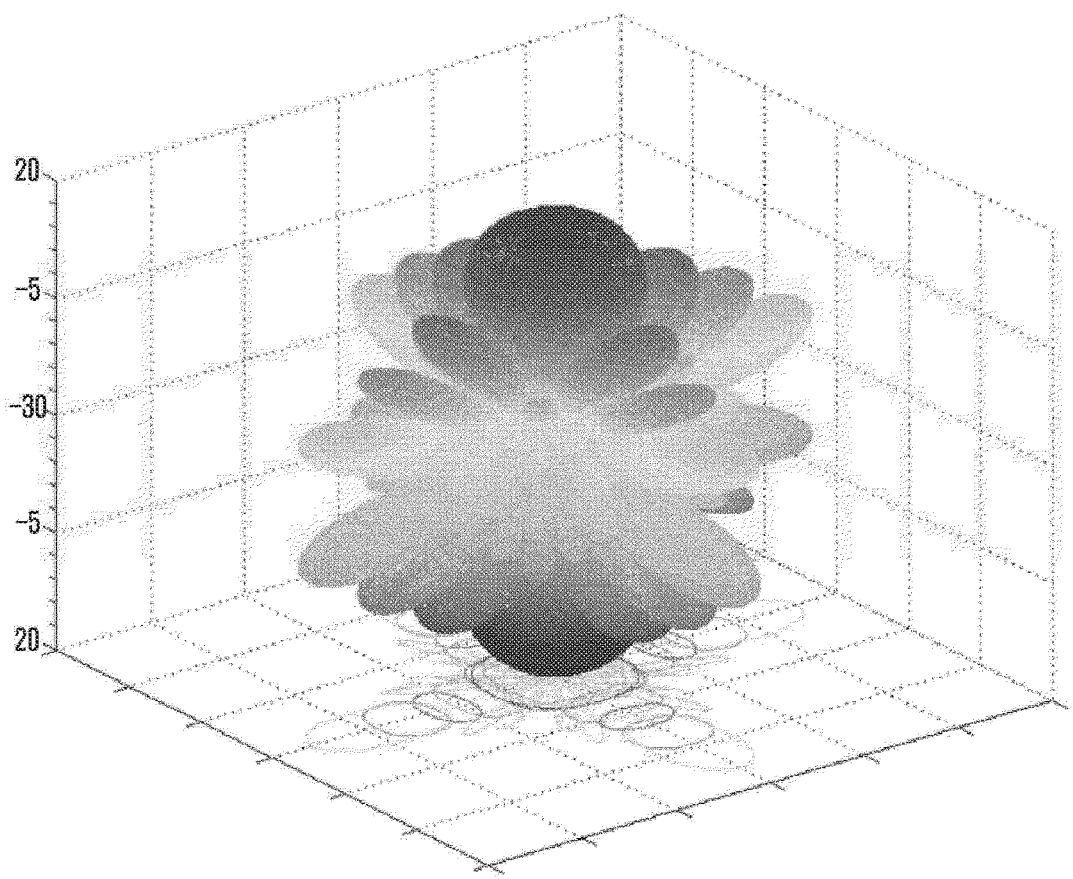

FIG. 4 is a graph of an analog beam pattern.

The graph of FIG. 4 indicates an analog beam pattern formed in the boresight direction (here, perpendicular to the frontal UPA plane) for the 8×8 UPA. of FIG. 3 with a spacing of 0.5λ (one-half wavelength of the carrier frequency) between antenna elements.

Figure 5:
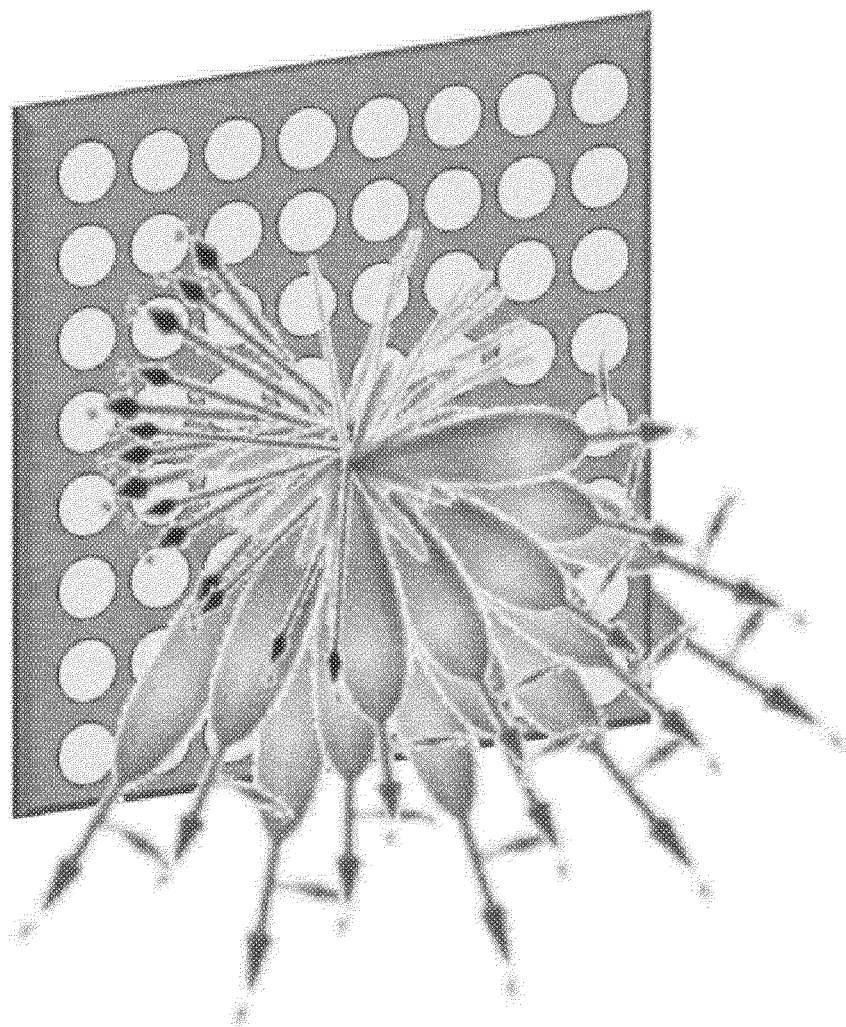
FIG. 5 illustrates a three dimensional beam pattern preconfigured for a given planar array antenna.

FIG. 5 illustrates a three dimensional beam pattern preconfigured for a given planar array antenna.

Figure 6A:
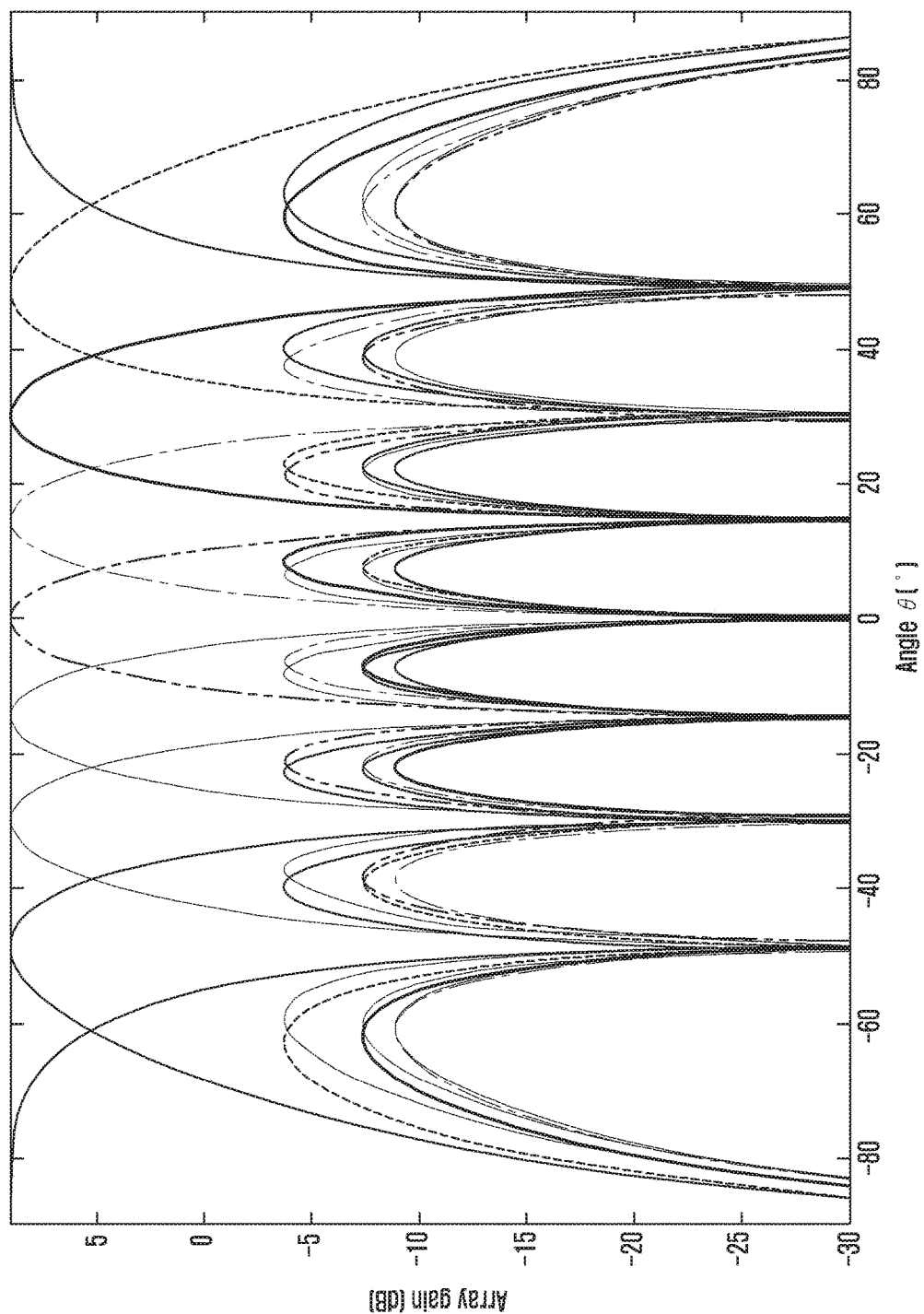

FIGS. 6A and 6B are a graph showing a relationship between angles and gains for a given beam pattern.

In FIG. 6A, for a 8×1 uniform linear array (ULA) structure using a beamforming configuration as shown in FIGS. 2 and 3, a plurality of unit analog beams are formed so as to divide one sector of 180 degrees into 8 parts with the same wavenumber on the basis of a beamforming weight coefficient such as a DFT matrix. This corresponds to a cross section of beams formed based on a beamforming weight coefficient applied to an 8×8 UPA in the horizontal or vertical direction. Here, it can be seen that individual unit beams are formed to have the same maximum beamforming gain in a particular direction and to support the 180-degree sector uniformly within the same beamforming gain range.

In FIG. 6B, for a 8×1 ULA structure using a beamforming configuration as shown in FIG. 6A, a plurality of unit analog beams are formed so as to divide one sector of 180 degrees into 16 parts with the same wavenumber on the basis of beamforming weight coefficients corresponding to column vectors of two different DFT matrixes. It can be seen from FIG. 6B that the number of beams is twice that in FIG. 6A, increasing the number of beamforming gain points at which beams intersect. Hence, it is possible to enhance performance within a wider beamforming gain range. However, this entails both an increase in overhead related to reference signals for different beams and an increase in feedback complexity. The above two schemes have a trade-off between performance and complexity. In general, the actual system may determine the scheme to use according to selection made in consideration of implementation and operation.

Figure 7A:
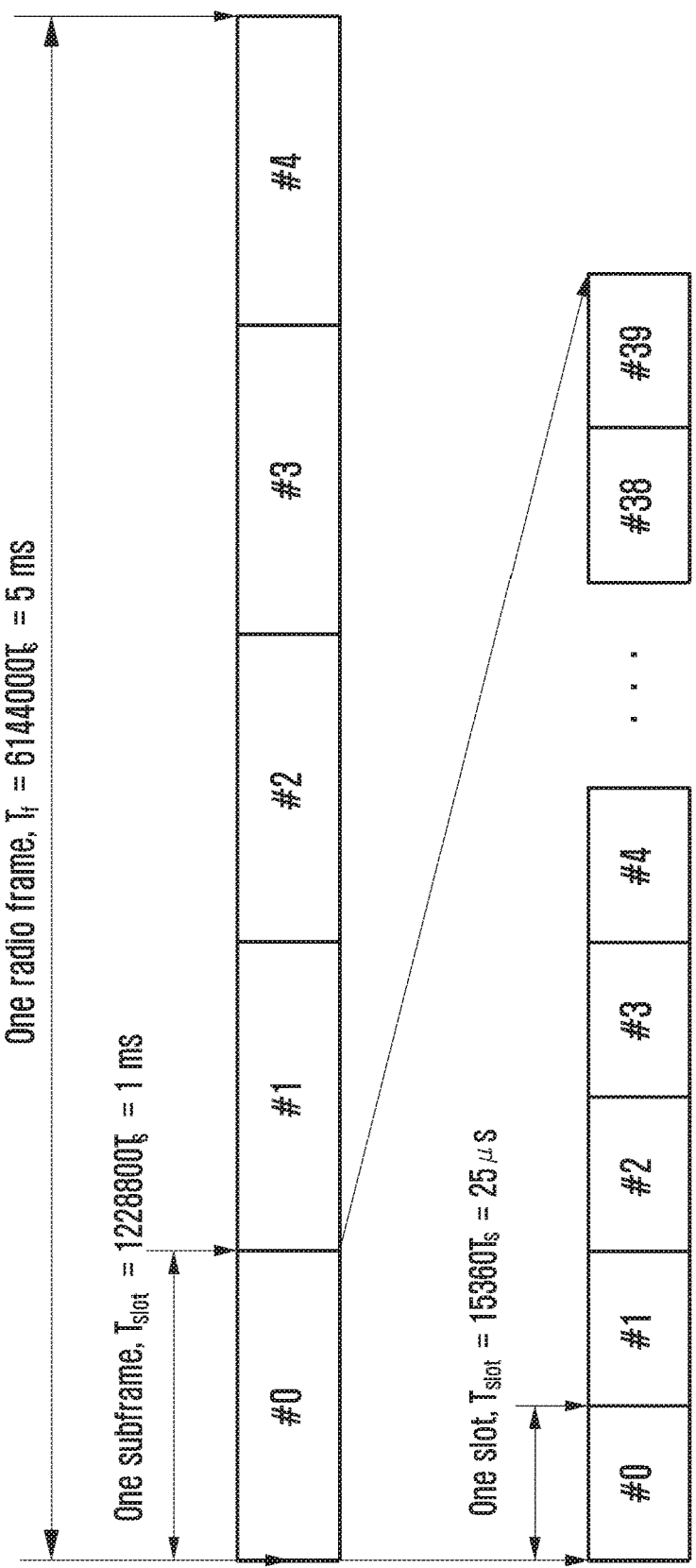
FIGS. 7A to 7C illustrate frame structures of a beamforming system
Figure 7B:
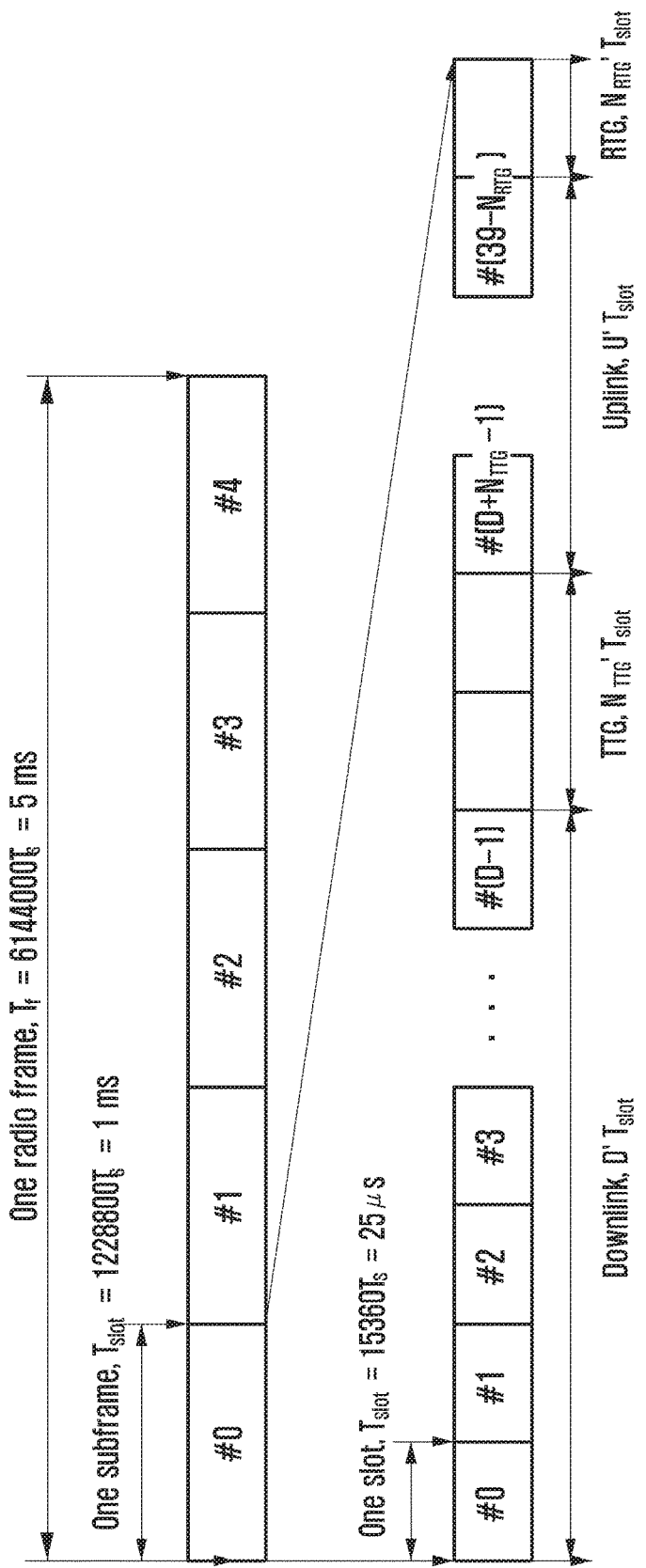
Figure 7C:
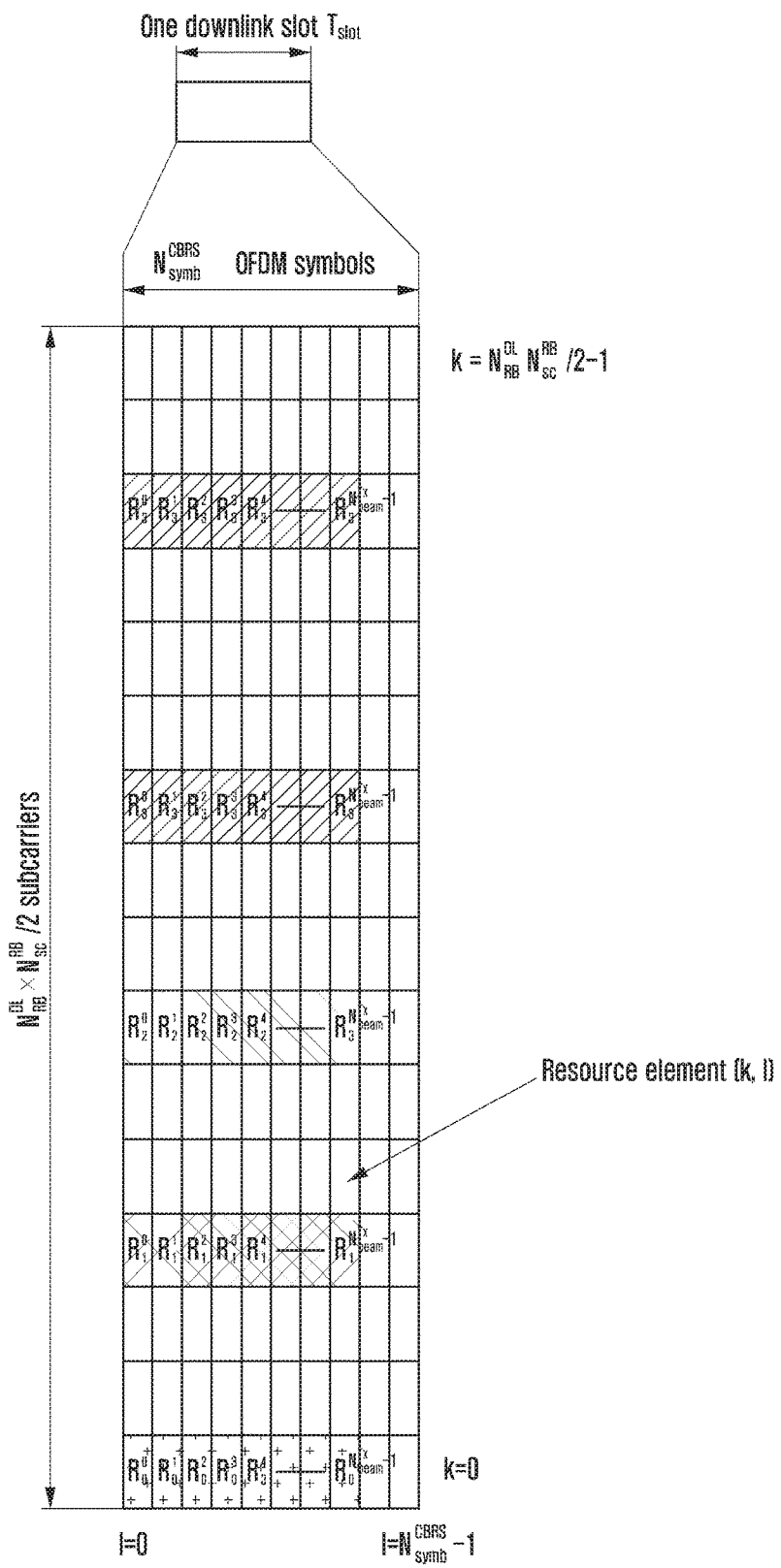

FIGS. 7A to 7C illustrate frame structures of a beamforming system. In FIGS. 7A to 7C, use of Orthogonal Frequency Division Multiplexing (OFDM) is assumed. Referring to FIGS. 7A to 7C, the frame structure includes a slot composed of a group of OFDM symbols, a subframe composed of a group of slots, and a frame composed of a group of subframes. The system operates with repetition of frames. For ease of operation, it is possible to consider to employ a superframe including one or more frames as an operational unit. Here, FIG. 7A illustrates a frame structure for Frequency Division Duplexing (FDD), and FIG. 7B illustrates a frame structure for Time Division Duplexing (TDD).

FIG. 7C illustrates resource allocation when specific time/frequency domain resources are used to transmit a channel state information reference signal (CSI-RS) for hybrid beamforming using the frame structure described above.

Referring to FIG. 7C, in the frequency domain, via one OFDM symbol of one slot, reference signals for analog beams corresponding to multiple Tx antennas or RF chains are simultaneously transmitted. For example, resources of the first column ($R_0^0$, $R_1^0$, $R_2^0$, $R_3^0$) in FIG. 7C are used to transmit reference signals for the same analog beam and used to transmit reference signals for different Tx antennas or RF chains. In the time domain, via different OFDM symbols, reference signals for analog beams corresponding to individual Tx antennas or RF chains are transmitted in sequence. For example, resources of the bottom row ($R_0^0$, $R_0^1$, $R_0^2$, $R_0^3$ . . . ) are used to transmit reference signals for the same Tx antenna or RF chain and used to transmit reference signals for different analog beams.

Here, the number of reference signals, for different beams, simultaneously transmittable via the same OFDM symbol may be limited by the number of RF chains in the Tx beamforming structure (limitation due to system characteristics) or by the density of reference signal pilots for the same beam in consideration of channel estimation performance in the frequency domain (limitation due to the standards). On the other hand, it is necessary to design reference signals, for different beams, to be sent at different points in time at the same frequency in consideration of the number of analog beams supported by each Tx antenna or RF chain. The number of analog beams may vary according to the cell/sector size of the base station, the beamforming structure based on the beamforming, gain and beam pattern, and the like.

As described above, the number of reference signals needed for channel estimation based on beamforming may vary according to the types of the beamforming structure conforming to system requirements related to beamforming operation. Hence, there is a need for a method of allocating resources to reference signals according to a preset frame structure and effectively transmitting the allocation information to the receiver (UE).

To this end, the following parameters may be considered.

$N_t$: the number of array antennas at the transmitter
$N_{tC}$: the number of RF chains at the transmitter
$M_t$: the cardinality of the Tx analog beam set
$M_t^v$: the cardinality of the Tx analog beam set in the vertical domain
$M_t^h$: the cardinality of the Tx analog beam set in the horizontal domain
$N_{subfrm}$: the number of subframes per frame
$N_{slot}$: the number of slots per subframe
$N_{sym}$: the number of OFDM symbols per slot
$I_{frm}$: frame number
$I_{subfrm}$: subframe number
$T_{RS}$: CSI-RS transmission period Values of the above parameters related to the Tx beamforming structure of the transmitter (ENB) and values of system parameters related to the frame structure and transmission of reference signals such as CSI-RS may be sent to the UE through capability negotiation between the ENB and UE at the time of initial network entry, unicast signaling from the ENB to the UE, or broadcast signaling from the ENB to multiple UEs (e.g. using a broadcast channel (PBCH)). Some of the parameters may be pre-agreed between the UE and the ENB, and the ENB and the UE may operate according to the pre-agreed parameters without separate parameter transmission.

In addition to the above system parameters, for per-antenna/beam channel estimation, at least one of the following parameters is needed for allocating reference signals and sending (by ENB) and receiving (by UE) the allocation information. Next, with reference to FIG. 8 and the subsequent drawings, a description is given of representing parameters needed directly or indirectly for efficiently allocating resources to per-antenna/beam reference signals and transmitting the corresponding allocation information under a given frame structure in a wireless communication system using beamforming.

Figure 8:
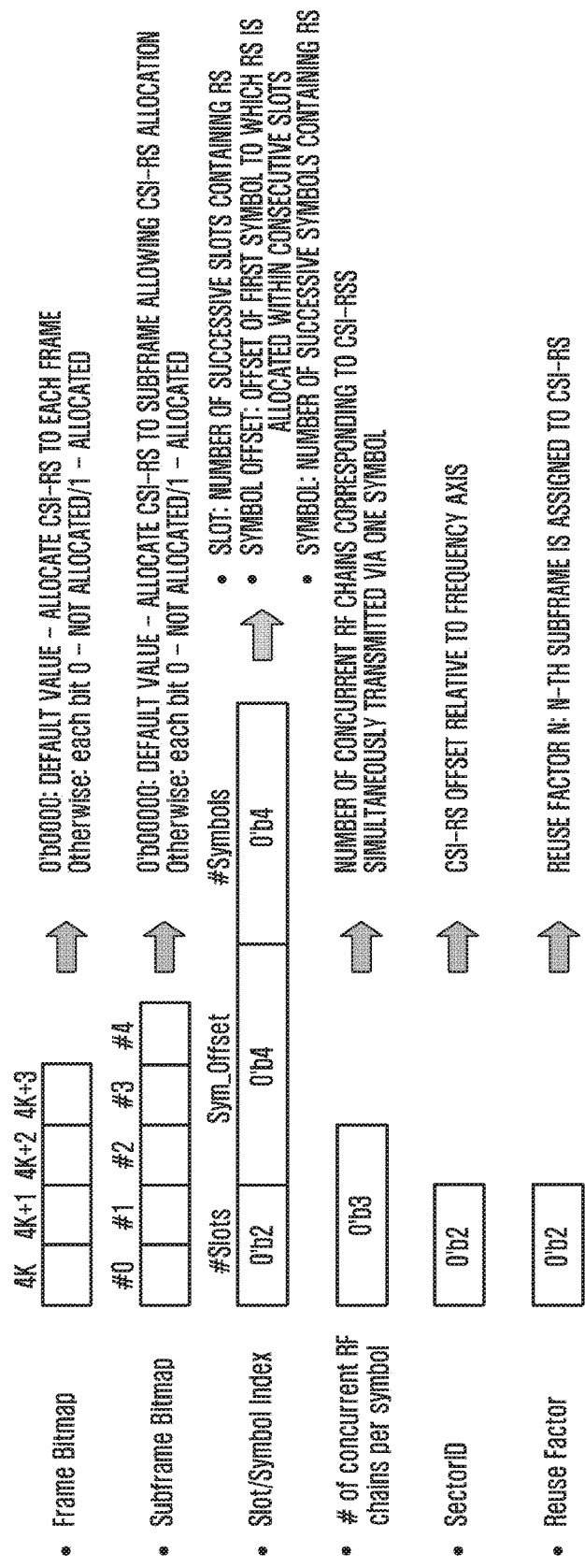
FIG. 8 illustrates representation of parameters related to CSI-RS according to embodiment of the present invention.

FIG. 8 illustrates representation of parameters related to CSI-RS according to an embodiment of the present invention.

FIG. 8 shows representation of parameters including frame bitmap, subframe bitmap, slot/symbol index, number of concurrent RF chains per symbol, sector ID, and reuse factor.

The frame bitmap has a default value of 0000 (binary), which indicates a CSI-RS is allocated to every frame. When the frame bitmap has a value other than the default value, bit 0 indicates that a CSI-RS is not allocated to (absent in) the corresponding frame and bit 1 indicates that a CSI-RS is allocated to (present in) the corresponding frame.

The subframe bitmap has a default value of 00000 (binary), which indicates that a CSI-RS is allocated to those subframes allowing CSI-RS allocation in the corresponding frame according to the CSI-RS transmission period and other settings. When the subframe bitmap has a value other than the default value, bit 0 indicates that a CSI-RS is not allocated to the corresponding subframe and bit 1 indicates that a CSI-RS is allocated to the corresponding subframe.

[1] The slot/symbol index may include #Slots (2 bits), Sym_Offset (4 bits) and #Symbols (4 bits). Here, #Slots indicates the number of successive slots containing RS, Sym_Offset indicates the offset of the first symbol to which RS is allocated within the successive slots, and #Symbols indicates the number of successive symbols containing RS.

The number of concurrent RF chains per symbol indicates the number of concurrent RF chains corresponding to CSI-RSs simultaneously transmitted via one symbol. When one symbol is used to simultaneously transmit 8 CSI-RSs for 8 RF chains, this parameter is set to 8. The number of concurrent RF chains per symbol may be represented by 3 bits.

The sector ID indicates the offset of CSI-RS relative to the frequency axis.

When the reuse factor set to 'n', this indicates that the $n^{th}$ subframe is assigned CSI-RS. The above parameters shown in FIG. 8 may be changed in range (size) according to the system design and changes in the beamforming structure, and may be represented in various other formats other than bitmap or binary.

FIG. 9A illustrates a procedure for reference signal allocation at the base station. FIG. 9A shows a procedure whereby the base station performs allocation for per-antenna/beam reference signals in consideration of the above system parameters and the Tx beamforming structure and derives parameters needed to transmit the corresponding allocation information.

Referring to FIG. 9A, there are listed parameters 910 related to the beamforming structure, parameters 920 related to the frame structure, and parameters 930 related to CSI-RS indication.

The parameters 910 related to the beamforming structure may include one or more of the number of array antennas, the number of RE chains, and the cardinality of the analog beam set per RF chain.

The parameters 920 related to the frame structure may include one or more of the transmission period of CSI-RS resource blocks, the number of OFDM symbols per CSI-RS resource block, and the number of RF chains corresponding to CSI-RSs simultaneously transmitted via the same OFDM symbol.

The base station may generate the parameters 930 related to CSI-RS indication on the basis of the parameters 910 related to the beamforming structure and/or the parameters 920 related to the frame structure.

The parameters 930 related to CSI-RS indication may include one or more of the following factors.

(1) The bitmap of CSI-RS resource blocks, or slot/subframe/frame offset within subframe/frame/superframe and the number of CSI-RS resource blocks, used for CSI-RS transmission (2) The bitmap of OFDM symbols, or the OFDM symbol offset within CST-RS resource blocks and the number of OFDM symbols within one CSI-RS resource block, used for CSI-RS transmission (3) The rule for CSI-RS assignment/mapping to OFDM symbols for CSI-RS (4) The analog beam index for CSI-RS within specific subframe/frame/superframe (rule for mapping between frame number and analog beam index). This parameter may be implicitly transmitted or determined. The base station may broadcast some of the parameters 910 related to the beamforming structure, the parameters 920 related to the frame structure, and the parameters 930 related to CSI-RS indication.

The parameters 930 related to CSI-RS indication may include time domain allocation information and/or frequency domain all information described later in connection with FIG. 9B.

The parameters described in FIG. 9A are illustrative, and the base station may generate the parameters 930 related to CSI-RS indication on the basis of some of the parameters 910 related to the beamforming structure and/or the parameters 920 related to the frame structure. The base station may also generate some of the parameters 930 related to CSI-RS indication.

FIG. 9B illustrates a procedure for parameter extraction at the user equipment. FIG. 9B illustrates a procedure whereby the UE derives information on time/frequency resource allocation for per-TX antenna/RF chain/beam reference signals from information regarding the system parameters, beamforming structure, reference signal allocation received from the base station via a broadcast channel or the like.

At step 950, the UE obtains system information. For example, the UE may receive system information broadcast by the ENB via a broadcast channel. The system information may include information needed to obtain some portion of information specified at step 950 and step 960.

At step 960, the UE obtains time domain allocation information. The time domain allocation information may include one or more of the following pieces of information.

(1) The number of analog beams per RF chain (2) Information indicating frame allocation. For example, frame bitmap, or (frame offset, number of frames, period).

(3) Information indicating subframe allocation (e.g. subframe bitmap)

(4) Slot allocation (e.g. number of slots)

(5) Symbol allocation (e.g. symbol offset, number of symbols)

At step 970, the UE obtains frequency domain allocation information.

The frequency domain allocation information may include one or more of the following pieces of information (1) The number of concurrent RF chains per symbol (number of simultaneously transmitted CSI-RSs)

(2) CSI-RS frequency offset (e.g. sector ID)

(3) CSI-RS frequency period (e.g. reuse factor)

Information acquisition at step 960 and information acquisition at step 970 may be carried out in sequence or in parallel. The order of information acquisition may be reversed if there is no logical precedence relationship.

At step 980, the LE obtains CSI-RS allocation information. The UE may obtain CSI-RS allocation information on the basis of the time domain allocation information at step 960 and the frequency domain allocation information at step 970. For example, the CSI-RS allocation information may be information on mappings between combinations of RF chain index and beam index, and time/frequency domain resources. That is, according to the above information, the UE may identify or infer the radio resource used to transmit a CSI-RS associated with a specific RF chain and analog beam. The UE may receive a CSI-RS using the CSI-RS allocation information, and generate a CSI report based on the CSI-RS and send the CSI report to the ENB. Thereafter, upon reception of the CSI report from the UE, the ENB may utilize the CSI report for resource allocation.

The CSI-RS allocation information may include a bitmap or mathematical expression of indexes indicating information on mappings between antennas/beams and time/frequency domain resources for reference signals. For example, in the CSI-RS allocation information, the relationship between Tx antenna and RF chain, and the relationship between antenna/RF chain and beam may be represented by a function of a resource index in the time and frequency domains as in the case of Equation 1 and Equation 2.

$$I_{RFChain} \rightarrow f(Q_{sc}, sectorID, ReuseFactor) \quad \text{Equation 1}$$

$$j_{beam} \rightarrow g(I_{frm}, K_{slot}, L_{sym}, T_{RS}) \quad \text{Equation 2}$$

Figure 10:
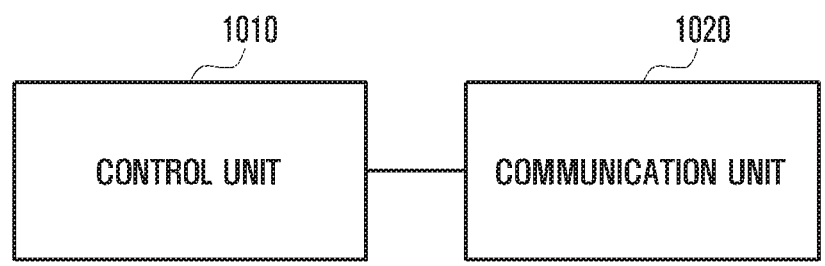
FIG. 10 is a block diagram of a base station according to an embodiment of the present invention.

FIG. 10 is a block diagram of a base station according to an embodiment of the present invention.

Referring to FIG. 10, the base station (ENB) according to an embodiment of the present invention may include a control unit 1010 and a communication unit 1020. The control unit 1010 controls individual components of the base station to carry out at least a part of the embodiments described above. In particular, the control unit 1010 may perform operations necessary for CSI-RS resource allocation. The communication unit 1020 sends and receives signals to carry out at least a part of the embodiments described above. In particular, the communication unit 1020 may send CSI-RS allocation information to a UE and receive a CSI report from the UE.

Figure 11:
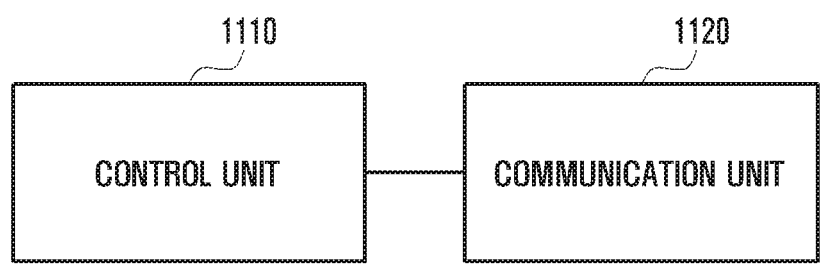
FIG. 11 is a block diagram of a user equipment according to an embodiment of the present invention.

FIG. 11 is a block diagram of a user equipment according to an embodiment of the present invention.

Referring to FIG. 11, the user equipment (UE) according to an embodiment of the present invention may include a control unit 1110 and a communication unit 1120. The control unit 1110 controls individual components of the UE to carry out at least a part of the embodiments described above. In particular, the control unit 1110 may perform operations necessary for obtaining CSI-RS resource allocation information. The communication unit 1120 sends and receives signals to carry out at least a part of the embodiments described above. In particular, the communication unit 1120 may receive CSI-RS allocation information from an ENB and send a CSI report to the ENB.

Hereinabove, a description is given of system operation in consideration of analog beamforming under a given frame structure in a wireless communication system based on beamforming. There is proposed an antenna/RF chain structure that may be operated in various forms according to the design of the Tx beamforming structure and analog beam of the base station. At least one embodiment of the present invention enables the wireless communication system to flexibly manage per-antenna/RF chain reference signals, allocate time/frequency resources to transmit the reference signals, and effectively send the corresponding allocation information. Thereby, it is possible to enhance transmission/reception performance of the wireless communication system through effective beamforming.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The above description is provided to assist in a comprehensive understanding of various embodiments of the present invention. It includes various specific details to assist n that understanding but these are to be regarded as merely exemplary. Accordingly, those of ordinary skill in the art will recognize that various changes and modifications of the embodiments described herein can be made without departing from the scope and spirit of the present invention.

The invention claimed is:

1. A method of radio resource allocation for a base station, the method comprising:
   obtaining frame structure information and beamforming structure information including a number of radio frequency (RF) chains and a number of analog beams per RF chain;
   generating resource allocation information for a channel state information reference signal (CSI-RS) based on the beamforming structure information and the frame structure information; and
   transmitting system information including the resource allocation information for the CSI-RS,
   wherein a number of reference signals in a same symbol of a slot, allocated based on the resource allocation information, is determined based on the number of RF chains, and
   wherein a number of reference signals in a same subcarrier of the slot, allocated based on the resource allocation information, is determined based on the number of analog beams per RF chain.

2. The method of claim 1, wherein the resource allocation information comprises a combination of an RF chain index and a beam index, time domain allocation information for the combination, and frequency domain allocation information for the combination.

3. The method of claim 1, wherein the resource allocation information comprises information regarding at least one of the number of analog beams per RF chain and the number of RF chains.

4. The method of claim 1,
   wherein the beamforming structure information further comprises information regarding at least one of a number of array antennas, and
   wherein the frame structure information comprises information regarding at least one of a CSI-RS resource block transmission period or a number of orthogonal frequency-division multiplexing (OFDM) symbols per CSI-RS resource block.

5. A base station comprising:
   a controller configured to:
      obtain frame structure information and beamforming structure information including a number of radio frequency (RF) chains and a number of analog beams per RF chain, and
      generate resource allocation information for a channel state information reference signal (CSI-RS) based on the beamforming structure information and the frame structure information; and
   a transceiver configured to transmit system information including the resource allocation information for the CSI-RS,
   wherein a number of reference signals in a same symbol of a slot, allocated based on the resource allocation information, is determined based on the number of RF chains, and
   wherein a number of reference signals in a same subcarrier of the slot, allocated based on the resource allocation information, is determined based on the number of analog beams per RF chain.

6. The base station of claim 5, wherein the resource allocation information comprises a combination of an RF chain index and a beam index, time domain allocation information for the combination, and frequency domain allocation information for the combination.

7. The base station of claim 5, wherein the resource allocation information comprises information regarding at least one of the number of analog beams per RF chain and the number of RF chains.

8. The base station of claim 5,
   wherein the beamforming structure information further comprises information regarding at least one of a number of array antennas, and
   wherein the frame structure information comprises information regarding at least one of a CSI-RS resource block transmission period or a number of orthogonal frequency-division multiplexing (OFDM) symbols per CSI-RS resource block.

9. A method of reference signal reception for a user equipment (UE), the method comprising:
   receiving system information from a broadcast channel;
   obtaining resource allocation information for a channel state information reference signal (CSI-RS) from the system information; and
   measuring CSI-RS based on the resource allocation information,
   wherein the resource allocation information includes a number of radio frequency (RF) chains and a number of analog beams per RF chain,
   wherein a number of reference signals in a same symbol of a slot, allocated based on the resource allocation information, is determined based on the number of RF chains, and
   wherein a number of reference signals in a same subcarrier of the slot, allocated based on the resource allocation information, is determined based on the number of analog beams per RF chain.

10. The method of claim 9, wherein the resource allocation information comprises a combination of an RF chain index and a beam index, time domain allocation information for the combination, and frequency domain allocation information for the combination.

11. A user equipment (UE) comprising:
   a transceiver configured to receive system information from a broadcast channel; and
   a controller configured to:
      obtain resource allocation information for a channel state information reference signal (CSI-RS) from the system information, and
      measure the CSI-RS based on the resource allocation information, wherein the system information includes a number of radio frequency (RF) chains and a number of analog beams per RF chain, wherein a number of reference signals in a same symbol of a slot, allocated based on the resource allocation information, is determined based on the number of RF chains, and wherein a number of reference signals in a same subcarrier of the slot, allocated based on the resource allocation information, is determined based on the number of analog beams per RF chain.

12. The user equipment of claim 11, wherein the resource allocation information comprises a combination of an RF chain index and a beam index, time domain allocation information for the combination, and frequency domain allocation information for the combination.

13. The user equipment of claim 12, wherein the time domain allocation information comprises information regarding at least one of frame allocation indication, subframe allocation indication, slot allocation, or symbol allocation, and wherein the frequency domain allocation information comprises information regarding at least one of a number of RF chains per symbol, a CSI-RS frequency offset, or a CSI-RS frequency period.

* * * * *